Dec. 12, 1933.  P. A. POTTER  1,939,570
BRACKET
Filed April 6, 1933
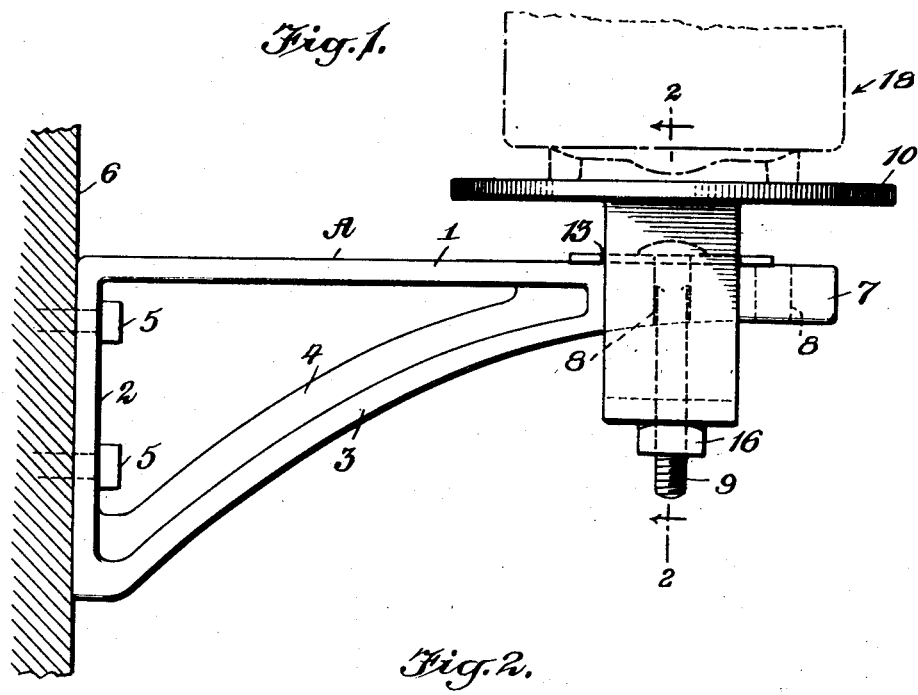
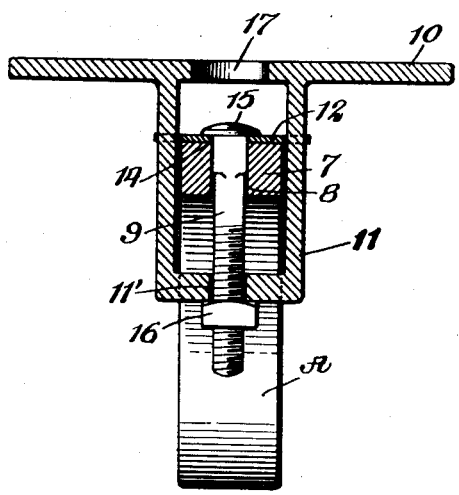
WITNESSES
INVENTOR
Philip A. Potter
BY
ATTORNEYS Patented Dec. 12, 1933

1,939,570

UNITED STATES PATENT OFFICE 1,939,570

BRACKET

Philip A. Potter, Hohokus, N. J.

Application April 6, 1933. Serial No. 664,801

3 Claims. (Cl. 248—30)

This invention relates to brackets, and more particularly to a bracket especially designed for supporting water meters, an object of the invention being to provide a bracket with an adjustable platform to take the weight from the water meter and allow a certain amount of adjustment so as to relieve pipes connected with the meter of all strain due to the weight of the meter.

It is a well known fact that water meters coupled to pipes and positioned in buildings are frequently supported directly on the floor, where they are subject to deterioration from dirt and moisture, or bricks or blocks are more or less carelessly placed under the meter to take the weight off the pipes with which the meter is connected.

My improved bracket affords a convenient, secure and satisfactory means for supporting the meter, and consists in certain novel features of construction and combinations and arrangements of parts, all of which will be more fully hereinafter described and pointed out in the claims.

In the accompanying drawing,—

Figure 1 is a view in side elevation illustrating my improved bracket in operative positon; and Figure 2 is a view in section on the line 2/2 of Figure 1.

My improved bracket includes a supporting arm, indicated generally by the reference character A. This arm includes a horizontal member 1, a vertical member 2 at one end of the arm 1, and a somewhat curved or diagonally braced member 3, all of said members being integral and preferably strengthened by a web 4. The member 2 is perforated to receive bolts or other securing devices 5 to secure the same to a wall or other support 6. The free end of the arm A constitutes a straight extension 7 which may have any desired number of openings 8 therein to accommodate an adjusting bolt 9.

10 represents a platform which may be circular in form and which is made integral with a depending angular sleeve 11, the latter adapted to receive the extension 7 and movable thereon, and having a bolt-receiving opening 11' on its lower end. A plate 12 is positioned in the angular sleeve 11 on the upper face of the extension 7 and is notched as shown at 13 to receive the side members of the sleeve 11. This plate 12 is perforated, as shown at 14, to receive the bolt 9, said perforation 14 and the upper portion of the bolt 9 being preferably angular in cross section to prevent turning movement of the bolt. The bolt 9 has a head 15 resting on the upper face of the plate 12, and a nut 16 is screwed on the threaded lower end to the bolt and bears on the lower end of the angular sleeve 11. The platform 10 is provided with a central opening 17 to permit the insertion and removal of the bolt 9.

It will be noted that with this improved form of bracket by adjusting the nut 16 the platform 10 may be raised or lowered to the exact height to properly support a water meter, such a meter being illustrated by dot-and-dash lines in Figure 1, and illustrated by the reference character 18. The plate 13 prevents angular tipping movement of the platform and the entire structure is strong and efficient for its purpose.

While I have illustrated what I believe to be the preferred embodiment of my invention it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A bracket of the character described, comprising a supporting arm having an opening therein, a platform, a sleeve on the platform receiving the arm, a bolt projected through the arm and through the lower end of the sleeve, and adjusting means on the bolt below the sleeve.

2. A bracket of the character described, comprising a supporting arm having an opening therein, a platform, a sleeve on the platform receiving the arm, a bolt projected through the arm and through the lower end of the sleeve, adjusting means on the bolt below the sleeve, and a plate on the arm within the sleeve notched to receive the sides of the sleeve.

3. A bracket of the character described including a supporting member having a plurality of bolt openings therein, a platform, an angular sleeve integral with the platform depending therefrom and receiving the arm, a notched plate on the arm within the sleeve, said plate and the lower end of said sleeve having openings registering with the openings in the arm, a bolt positioned in said openings with the head of the bolt resting on the plate, and a nut screwed onto the lower end of the bolt and against the lower end of the sleeve.

PHILIP A. POTTER.